(12) United States Patent
Brothers

(10) Patent No.: US 11,802,664 B2
(45) Date of Patent: Oct. 31, 2023

(54) STORAGE TANK FOR CRYOGENIC LIQUID

(71) Applicant: Custom Biogenic Systems, Inc., Bruce Township, MI (US)

(72) Inventor: John G. Brothers, Bruce Township, MI (US)

(73) Assignee: CUSTOM BIOGENIC SYSTEMS, INC., Bruce Township, MI (US)

( * ) Notice: Subject to any disclaimer, the term of this patent is extended or adjusted under 35 U.S.C. 154(b) by 286 days.

(21) Appl. No.: 16/560,168

(22) Filed: Sep. 4, 2019

(65) Prior Publication Data

US 2019/0390822 A1 Dec. 26, 2019

Related U.S. Application Data

(63) Continuation-in-part of application No. 15/959,494, filed on Apr. 23, 2018.

(51) Int. Cl.
*F17C 5/02* (2006.01)
*F17C 13/02* (2006.01)
*F17C 13/04* (2006.01)

(52) U.S. Cl.
CPC ............... *F17C 5/02* (2013.01); *F17C 13/02* (2013.01); *F17C 13/04* (2013.01); *F17C 2203/0629* (2013.01); *F17C 2203/0643* (2013.01); *F17C 2205/0332* (2013.01); *F17C 2221/014* (2013.01); *F17C 2223/0161* (2013.01); *F17C 2250/0417* (2013.01)

(58) Field of Classification Search
CPC .. F17C 13/02; F17C 13/04; F17C 2203/0629; F17C 2203/0643; F17C 2205/0332; F17C 2221/014; F17C 2223/0161; F17C 2250/0417; F17C 5/02
See application file for complete search history.

(56) References Cited

U.S. PATENT DOCUMENTS

| 4,570,819 | A  | * | 2/1986  | Perkins | F17C 6/00 141/97 |
| 6,295,869 | B1 | * | 10/2001 | Delatte | G01F 23/268 361/284 |
| 9,618,257 | B2 | * | 4/2017  | Black   | F17C 3/085 |
| 10,746,586 | B2 | * | 8/2020  | Crouse  | G01F 23/284 |

OTHER PUBLICATIONS

Gavin Duffy, Modeling a Process—Filling a Tank, 2015 (Year: 2015).*

(Continued)

*Primary Examiner* — Nael N Babaa
(74) *Attorney, Agent, or Firm* — Brown & Michaels, PC

(57) ABSTRACT

A storage tank for cryogenic liquid includes an outer tank constructed of a rigid material and an inner tank contained within and spaced inwardly from the outer tank. A supply line supplies cryogenic liquid to a plurality of cryogenic freezers. A fill line having a diameter greater than the supply line allows the storage tank to be filled at a greater speed relative to filling through the supply line and allows the storage tank to be filled while supply cryogenic liquid to the cryogenic freezers. A level sensor processes an impedance to calculate a level of the inner tank and a reporting unit displays the level and may report the level to a remote server.

10 Claims, 5 Drawing Sheets

(56) References Cited

OTHER PUBLICATIONS

Tom Peterson, Cryogenic Safety with Emphasis on Overpressure Protection of Low Temperature Helium Vessels, USPAS, 2017 (Year: 2017).*
InstrumentationToolBox, Operating Principle of Capacitance Level Sensors, instrumentationtoolbox.com, 2013 (Year: 2013).*
NASA, Mass Flow Rate, 2015 (Year: 2015).*
ERA Environmental Management Solutions, Oil & Gas Tanks Emissions Management: Splash Vs. Submerged Loading, 2015 (Year :2015).*
Eddie, Fuel Capacitance Probes, Last revision: Jan. 27, 2015, CODE7700.com (Year: 2015).*

* cited by examiner

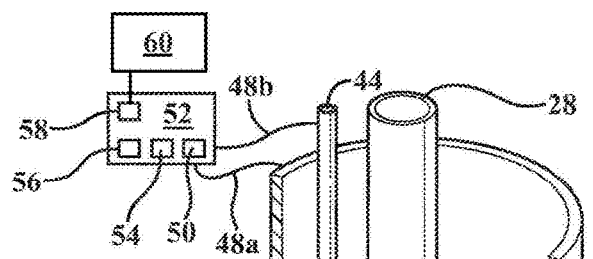
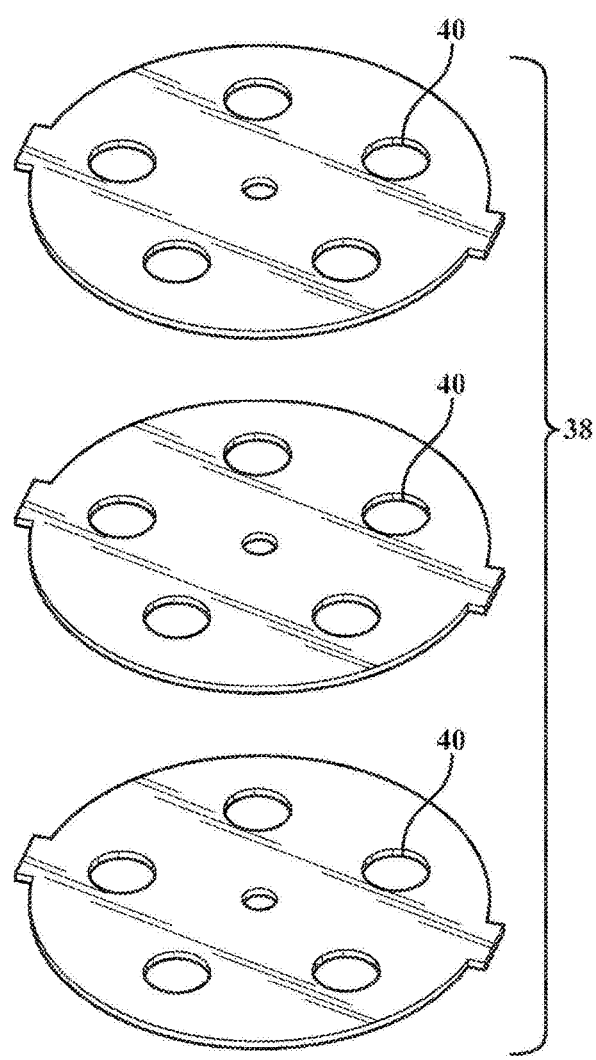
FIG. 5
FIG. 6

STORAGE TANK FOR CRYOGENIC LIQUID

CROSS-REFERENCE TO RELATED APPLICATIONS

This application is a Continuation-in-Part Application of U.S. patent application Ser. No. 15/959,494 filed on Apr. 23, 2018, the contents of which are incorporated herein.

TECHNICAL FIELD

The present disclosure relates generally to storage tanks for cryogenic liquid.

BACKGROUND

Cryogenic liquids, for example liquid nitrogen, are used for a number of different purposes. For example, cryogenic liquid is oftentimes used in a cryogenic freezer to store biological specimens such as sperm, human and animal tissue, and the like. Facilities such as hospitals, laboratories, and other research institutions may contain several cryogenic freezers to store biological specimens. It is well known that such biological specimens may be stored at cryogenic temperatures for long periods of time without degradation.

The cryogenic freezers used to store the biological specimens are highly thermally insulated in order to maintain the cryogenic temperatures within the interior of the freezer. However, some loss of the cryogenic temperatures occurs not only through natural thermal conduction, but also whenever the cryogenic freezer is opened for either the removal or insertion of the biological specimens. A cryogenic tank is used to refill the cryogenic freezers.

Current cryogenic tanks have a single line which serves to both supply cryogenic liquids to the cryogenic freezer and to replenish the contents of the cryogenic tanks. As the heat gain of the cryogenic freezers is relatively small, the single line is relatively small-that is a diameter of less than three-quarters of an inch. As such, it may take several hours to replenish the cryogenic tank.

Further, current cryogenic tanks are equipped with a conventional valve system configured to measure the pressure of the cryogenic tank and the level of the cryogenic tank. Such conventional valve system determines a level and a pressure based upon mechanical devices. The valve allows for the cryogenic tank to vent pressure beyond a predetermined amount. As such, it is desirable to limit the pressure during filling operations as an actuation of the vent may release the cryogenic liquid when releasing pressure, reducing the amount of cryogenic liquid available for cooling operations.

Accordingly, it remains desirable to have a cryogenic tank configured to decrease the time needed to fill the cryogenic tank relative to current cryogenic tanks without actuating the vent so as to prevent loss of cryogenic liquid. It further remains desirable to have a cryogenic tank configured to determine a level of the tank based upon input other than a mechanical device. It further remains desirable to have a cryogenic storage system configured to send a message to a network indicating the level of the cryogenic tank.

SUMMARY OF THE PRESENT DISCLOSURE

The present disclosure provides a storage tank for cryogenic liquid which overcomes the above-mentioned disadvantages of the previously known cryogenic tanks.

In brief, the storage tank includes an outer tank constructed of a rigid material such as stainless steel. An inner tank is contained within and spaced inwardly from the outer tank and the inner tank is also constructed of a rigid material, such as stainless steel. Insulation may be provided within the space between the inner and outer tanks, and the space between the inner and outer tanks is preferably evacuated. The inner tank is adapted to contain a cryogenic liquid, such as liquid nitrogen.

Furthermore, conventional valving is fluidly connected to the inner tank. The conventional valving includes a supply line for accessing the inner tank so as to both supply cryogenic to a cryogenic freezer or other device requiring the cryogenic liquid and replenishing the inner tank with a cryogenic liquid. The conventional valving includes a pressure relief valve system and a pressure and level detection valve system.

In addition to the supply line, a fill line for cryogenic liquid has its first end open through a valve exteriorly to the outer tank and its inner end open to the interior of the inner tank, preferably adjacent its lower end. This fill line, unlike the supply line, is several times the cross-sectional area of the supply line. As such, the liquid flow rate of the liquid nitrogen that can be maintained through the fill line is much greater than can be maintained through the supply line. This, in turn, allows the entire inner tank to be rapidly filled in contrast to the slower fill time while using the previously known smaller diameter liquid lines for the cryogenic tank.

A pressure relief valve is also provided. The pressure relief valve having a diameter greater than the diameter of the fill line so as to accommodate the release of head pressure generated by the replenishment of cryogenic liquid through the fill line.

In one aspect of the disclosure, a level sensor is provided. The level sensor is configured to be seated within the inner tank through the supply line. The level sensor is configured to detect a change in an electric resistance to calculate a level of the inner tank.

In one aspect of the disclosure, a reporting unit is provided. The reporting unit is in communication with the level sensor. The reporting unit includes a display configured to display the level detected by the level sensor. A transmitter is configured to transmit the level to a server, wherein the reporting unit may generate a warning displayed on the display and/or transmitted to the server indicating that the level is below a predetermined threshold.

BRIEF DESCRIPTION OF THE DRAWING

A better understanding of the present disclosure will be had upon reference to the following detailed description when read in conjunction with the accompanying drawing, wherein like reference characters refer to like parts throughout the several views, and in which:

FIG. 5 is a perspective views of the baffles shown in FIG. 4; and FIG. 6 is a cross-sectional view of the level sensor.

DETAILED DESCRIPTION OF A PREFERRED EMBODIMENT

A storage tank is provided. The storage tank is configured to supply a plurality of cryogenic freezers with a cryogenic liquid through a supply line and be refilled through a fill line having a diameter at least twice as large as the diameter of the supply line so as to reduce the time required to resupply of liquid nitrogen stored in the storage tank relative to using the supply line. In one aspect, the storage tank further includes a level sensor configured to determine a level of cryogenic liquid in the tank by measuring a resistance. In another aspect, the storage tank includes a reporting unit configured to display the level of the tank and report a level of the tank to a server.

Figure 1:
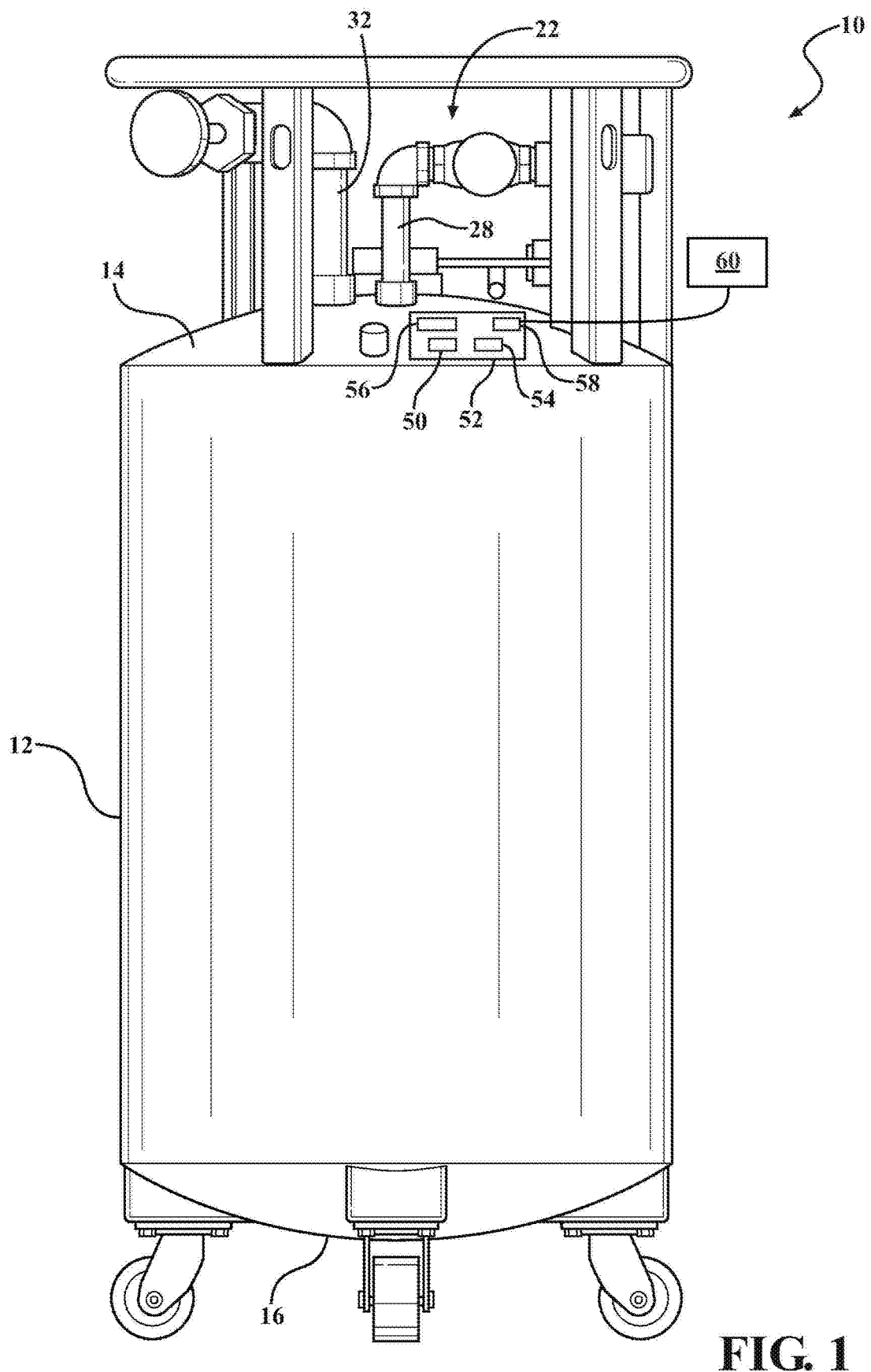
FIG. 1 is a front view illustrating a preferred embodiment of the storage tank according to one or more embodiments described herein.

With reference first to FIG. 1, a preferred embodiment of a cryogenic storage tank 10 according to the present disclosure is shown. The cryogenic storage tank 10 stores cryogenic liquid, such as liquid nitrogen, for many different purposes. One such purpose, for example, is to provide the liquid nitrogen to cryogenic freezers of the type used to store biological specimens.

Figure 3:
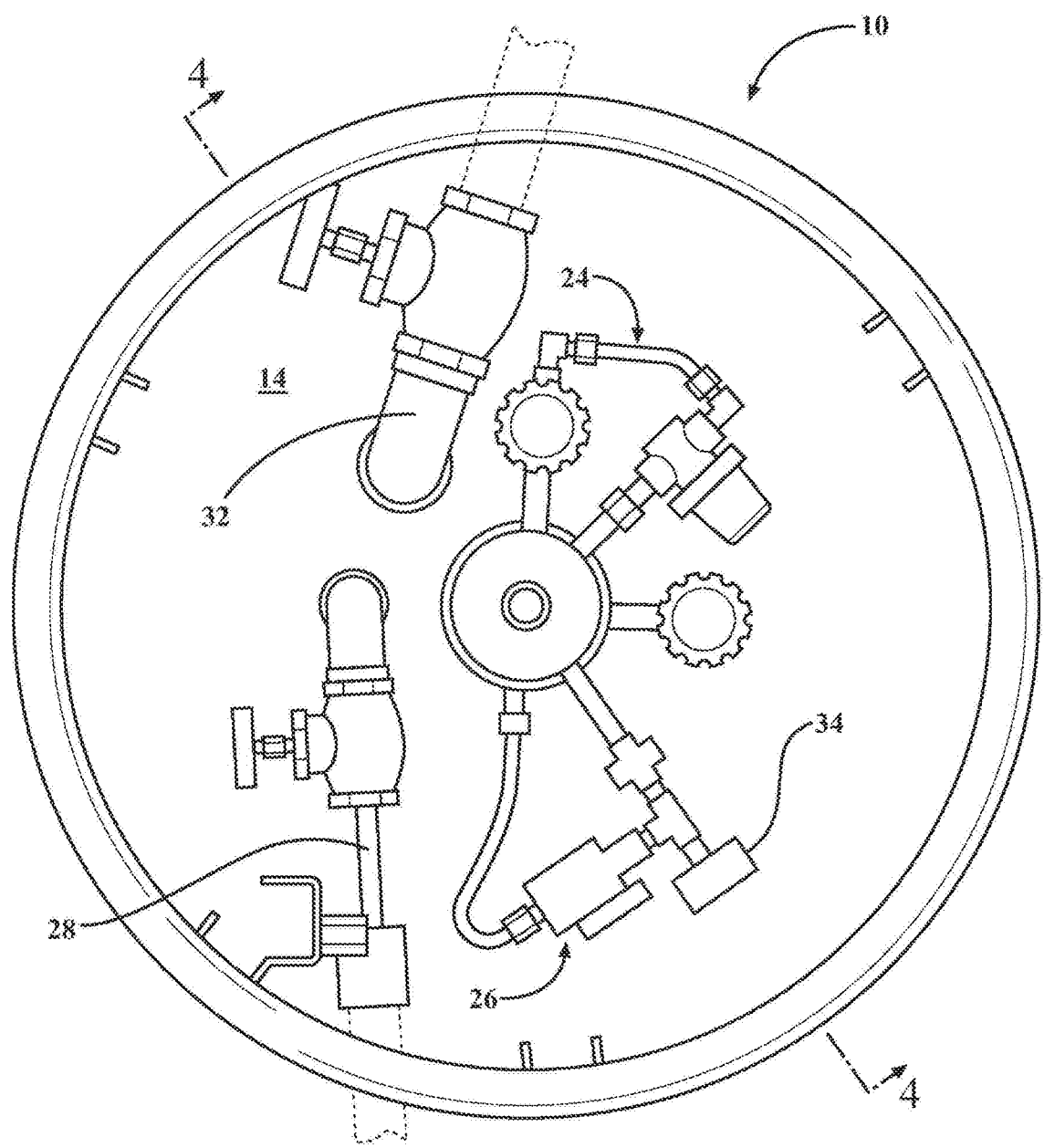
FIG. 3 is a top down view of the storage tank shown in FIG. 1.
Figure 4:
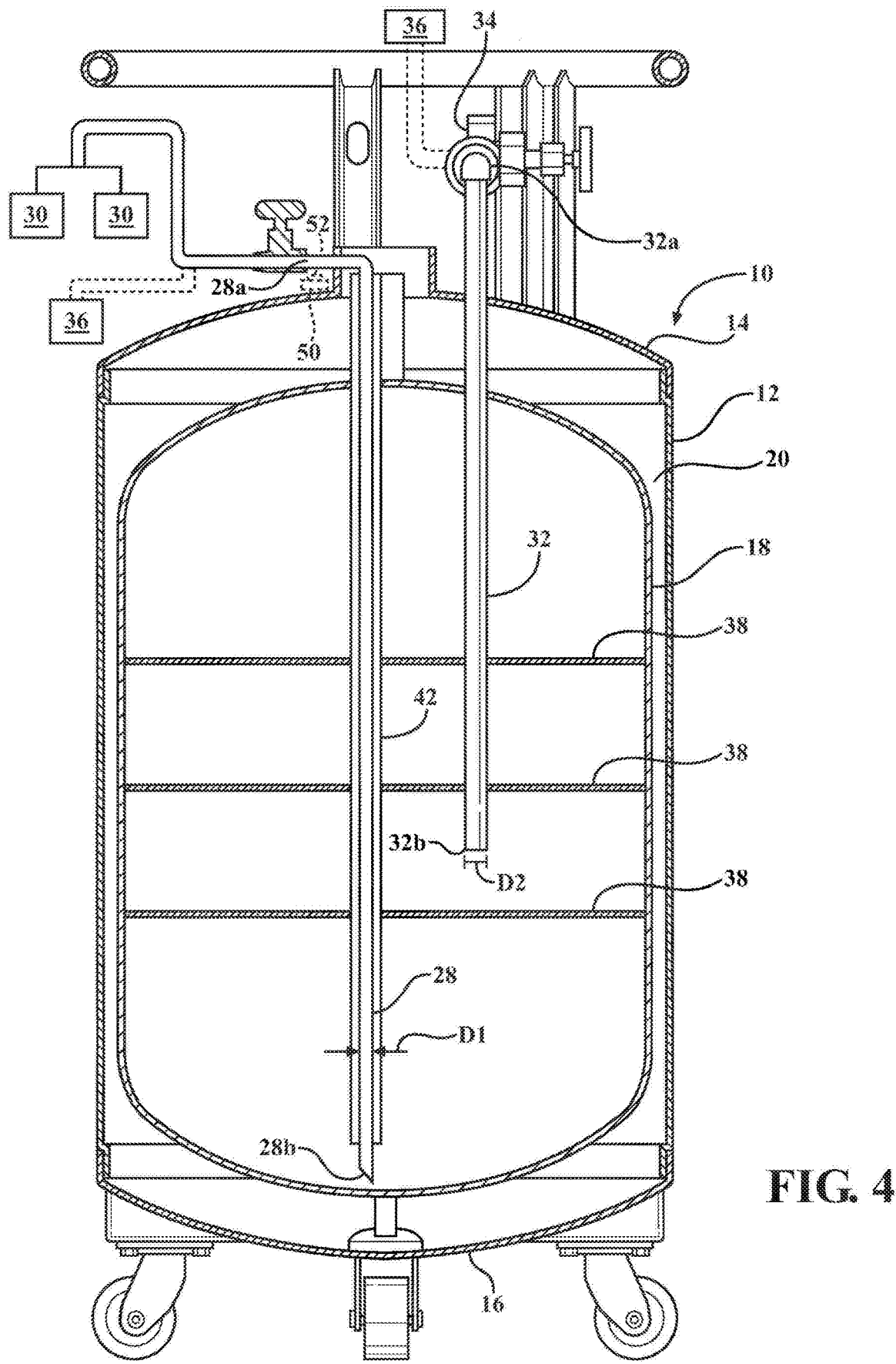
FIG. 4 is a cross-sectional view of the storage tank shown in FIG. 3, taken along line 4-4.

With reference now to FIG. 4, a cross-sectional view of the cryogenic storage tank 10 taken along line 4-4 of FIG. 3 is provided. The cryogenic storage tank 10 includes an outer tank 12 which is generally cylindrical in shape having a closed top 14 and closed bottom 16. The outer tank 12 is typically constructed of stainless steel although other materials may be used without deviation from either the spirit or scope of the disclosure.

The cryogenic storage tank 10 includes an inner tank 18. The inner tank 18 is completely contained within the interior of the outer tank 12. The inner tank 18 is generally cylindrical in shape is contained within the interior of the outer tank 12. This inner tank 18 is also preferably made of stainless steel and is spaced inwardly from the outer tank 12. As such, an inner space 20 is created between the inner tank 18 and the outer tank 12. In the conventional manner, this storage space 20 is typically evacuated and/or filled with a thermal insulating material.

Figure 2:
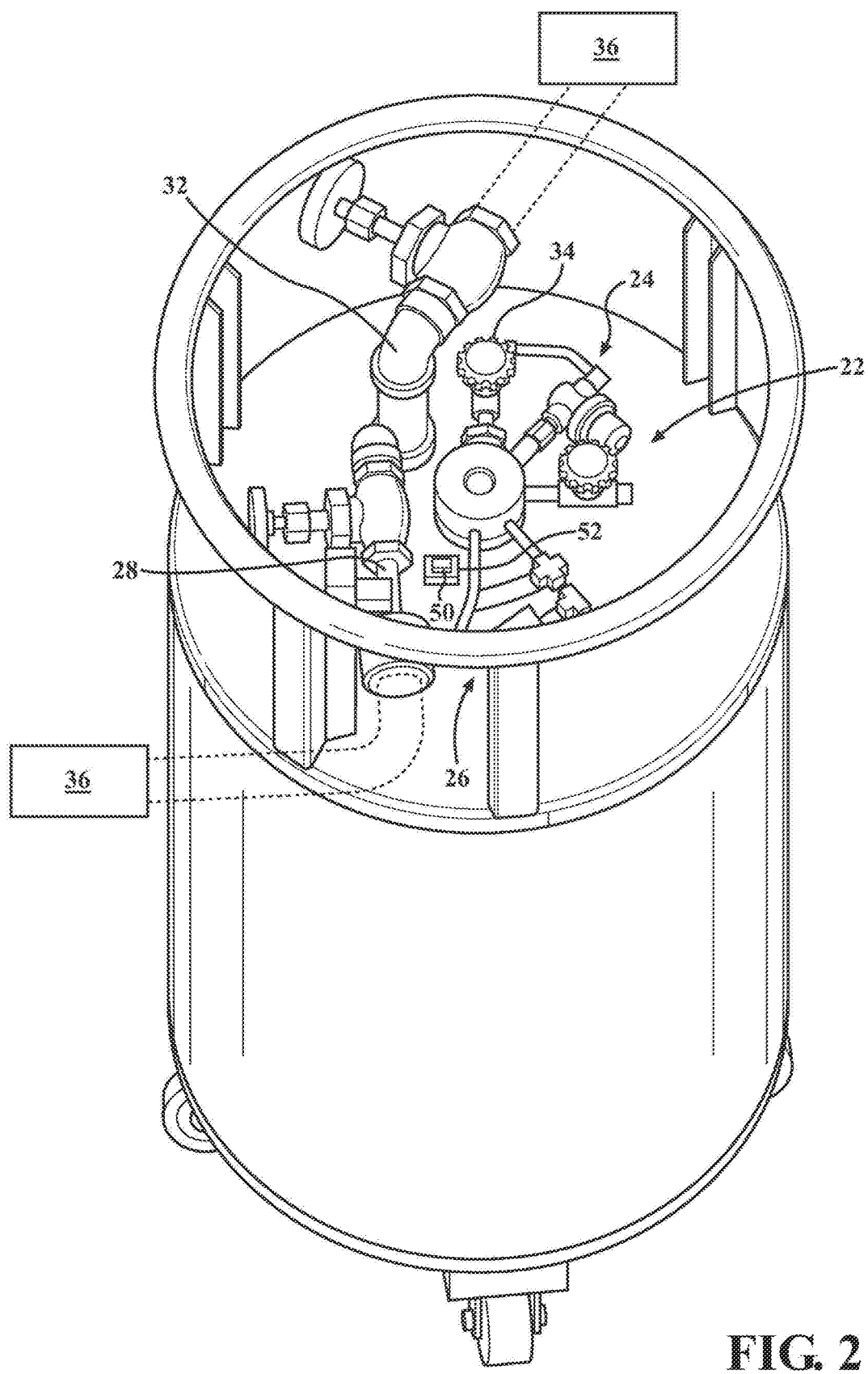
FIG. 2 is a perspective view of FIG. 1 taken from the top.

As best shown in FIGS. 2 and 3, a conventional valve assembly 22 is mounted to the top 14 of the outer tank 12. This valve assembly 22 includes a pressure relief valve system 24 and a monitoring valve system 26. The pressure relief valve system 24 includes a plurality of vents and valves configured to allow a predetermined pressure in a head space of the storage tank 10 to escape. The monitoring valve system 26 includes conventional valves and vents configured to detect a pressure of the head space and a level of the inner tank 18. The pressure relief valve system 24 and the monitoring valve system 26 are conventional valve systems and any pressure relief valve system 24 and the monitoring valve system 26 currently known may be adapted for use herein.

The valve assembly 22 further includes a supply line 28 configured to supply cryogenic liquid stored in the inner tank 18 to at least one of a plurality of cryogenic freezers 30. A valve is fluidly coupled to the supply line 28 configured to open or close the supply line 28. The supply line 28 includes a first end open 28a exteriorly of the outer tank 12 and a second end open 28b disposed within the inner tank 12. The supply line 28 is fluidly sealed to both the inner tank 18 and the outer tank 12. The supply line 28 has a constant diameter. In one aspect, the supply line 28 extends downwardly towards the bottom end of the inner tank 18, wherein internal pressure built up by the cryogenic liquid provides the pressure to supply the cryogenic liquid to the cryogenic freezer(s) 30. The supply line 28 has a diameter "D1" configured to generate a first predetermined flow rate at a first predetermined filling pressure.

The storage tank further includes a fill line 32. The fill line 32 has a generally uniform diameter. The fill line 32 has a first open end 32a which extends outwardly from the top 14 of the cryogenic outer tank 12. The second fill line 32, furthermore, extends through both the outer tank 12 and into the inner tank 18. A second open end 32b opposite of the first open end 32a is disposed within the inner tank 18. In one aspect, the fill line 32 extends approximately two-thirds into the inner tank 18, however, it should be appreciated that the fill line 32 may extend to the bottom of the inner tank 18.

The diameter "D2" of the fill line 32 is at least twice as large as the diameter of the supply line 28. This greater area, furthermore, allows a much greater flow rate through the fill line 32 than the supply line 28 with pressure provided by a source 36 of cryogenic liquid. In particular, the fill line 32 is configured to refill the inner tank 18 at a second predetermined flow rate the predetermined filling pressure, wherein the second flow rate is several times greater than the first flow rate.

The fill line 32 has an inside diameter greater than the inside diameter of the primary or supply line 28. As such, the cross sectional area of the interior of the fill line 32 is several times the cross sectional area of the supply line 28. Thus, the flow rate of the fill line 32 is greater than the flow rate of the supply line 28 at the same pressure.

The storage tank further includes a second relief vent 34, the second relief vent 34 is disposed on the closed top and extends through the outer tank 12 into the head space of the inner tank 18. The second relief vent 34 has a diameter that is greater than the diameter of the fill line 32 so as to account for the gaseous expansion of the cryogenic liquid. The second relief vent 34 may be configured to release pressure in the head space of the inner tank beyond a predetermined threshold.

In operation, only a small volume of cryogenic liquid from the interior of the inner tank 18 is used to supply the cryogenic equipment 30. FIG. 4 provides an illustration depicting an exterior line coupled to the valve which opens and closes the supply line 28. As such, only a very small flow rate of the cryogenic liquid from the inner tank 18 is required to operate the cryogenic equipment 30, for example the supply line 28 may have a diameter configured to provide a flow rate of 0.726 Liters per Second at 50 psi. Consequently, the supply line 28 typically has a very small diameter, e.g. one quarter of an inch.

Although the cryogenic tank 10 may be refilled with the cryogenic liquid by fluidly connecting a source 36 of cryogenic liquid to the valve assembly 22, in particular, the supply line 28, the fill time required for the cryogenic tank 18 is very slow. A depiction of a source 36 coupled to the supply line 28 is illustratively shown in dashed lines in FIG. 4.

In order to provide a rapid fill for the inner tank 18 of cryogenic liquid, a source 36 of cryogenic liquid is fluidly connected to the fill line 32 having a diameter of one and a half inches, e.g. twice the diameter of the supply line 28. As such, the fill line 32 further provides the benefit of a storage tank 10 that is able to supply cryogenic liquid to cryogenic freezers 30 while being refilled concurrently. This dimension of the fill line 32 is able to achieve a flow rate of up to 64.97 Liters per second at 50 psi.

In the example above, the measurements were taken from a storage tank 10 has a total fill volume by weight of 230 lbs of cyrogenic liquid. The flow rate was taken at the same pressure to minimize cryogenic liquid loss due to a pressure build up within the cryogenic tank which causes the pressure relief system 24 and the second relief vent 34 from actuating so as to prevent cryogenic liquid from escaping. As such, it is possible to fill the storage tank 10 within five minutes under 50 psi using the fill line 32 as opposed to 40 minutes under 50 psi using the supply line 28.

With references now to FIGS. 4 and 5, the cryogenic storage tank 10 includes baffles 38. The baffles 38 are generally disc shaped and are contained with the inner tank 18. As best shown in FIGS. 4 and 5, one or more liquid baffles 38 are contained within the interior of the inner tank 18 and are axially spaced from each other. These baffles 38 include through openings 40 to minimize sloshing of the cryogenic liquid during a refill operation conducted by the fill line 32. It should be appreciated that the size and dimensions of the through openings 40 are provided for illustrative purposes and are not limiting to the scope of the appended claims.

In operation, when refilling of the cryogenic tank 10 is required, a refill source 36 of cryogenic liquid is first fluidly connected to the fill line 32. Thereafter, a knob is turned so as to open fill line 32, which allows the cryogenic liquid from the refill source 36 to flow through the fill line 32 and into the interior of the inner tank 18.

With reference again to FIGS. 2-4, the storage tank may further include a level sensor 42. The level sensor 42 is configured to be seated within the inner tank 18 and is threaded to a threaded opening of the closed top 14. The level sensor 42 is configured to detect a cryogenic liquid level within the inner tank 18 by processing an electric resistance. In one aspect, the level sensor 42 is a capacitance sensor includes an inner rod 44 disposed within an outer sleeve 46. The outer sleeve 46 has an open bottom so as to allow cryogenic liquid to rise therein. The inner rod 44 is centered within the outer sleeve 46 so as to be spaced apart from the inner surface of the outer sleeve 46 and fixed in position so as to define a uniform gap between the outer surface of the inner rod 44 and the inner surface of the outer sleeve 46. The level sensor 42 is configured to detect a change in an electric resistance to calculate a level of the inner tank 18.

FIG. 6 shows a cross-sectional view of the level sensor 42, the inner rod 44 and the outer sleeve 46 are electrodes. The supply line 28 disposed within the outer sleeve 46 as well. The inner rod 44 and the outer sleeve 46 are conductive. The inner rod 44 and the outer sleeve 46 are each connected to an electric line 48a and 48b which are connected to an electronic circuit 50. As is known, the level may be calculated by determining the change in resistance between the inner rod 44 and the outer sleeve 46 due to the introduction of cyrogenic liquid between the outer surface of the inner rod 44 and the inner surface of the outer sleeve 46.

The electronic circuit 50 is housed in a reporting unit 52. The reporting unit 52 may include an electrical outlet configured to plug into a utility or residential outlet. The reporting unit 52 may include a back-up battery 54 in the event an interruption occurs in electrical power. The reporting unit 52 includes a display 56. The reporting unit 52 is in communication with the level sensor 42. In particular, the electric lines 48a, 48b define a circuit, wherein 48a provides an input signal, and the impedance is detected by the electronic circuit 50 and a level determining unit of the electronic circuit 50 processes the impedance to calculate a level of cryogenic liquid within the inner tank 18. The level is then displayed on the display 56.

In one aspect of the reporting unit 52, the reporting unit includes a transmitter 58. In one aspect of a transmitter 58, the transmitter 58 is a wireless transmitter which may be configured to transmit a level detected by the level sensor 42. For instance, the transmitter 58 may transmit the level via blue tooth or a WiFi network to a remote server 60. In another aspect, the transmitter 58 is a cable configured to transmit through an electric signal. In another aspect, the reporting unit 52 may generate a warning displayed on the display 56 and/or transmitted to the server 60 indicating that the level is below a predetermined threshold.

From the foregoing, it can be seen that the cryogenic storage tank of the present disclosure provides a storage tank which enables rapid refilling of the storage tank as required. Having described my disclosure, however, many modifications thereto will become apparent to those skilled in the art to which it pertains without deviation from the spirit of the disclosure as defined by the scope of the appended claims.

I claim:

1. A storage tank for cryogenic liquid comprising:
   an outer tank constructed of a rigid material;
   an inner tank contained within and spaced inwardly from said outer tank;
   a supply line for cryogenic liquid having a first end open exteriorly of the outer tank and a second end open inside the inner tank, the supply line having a first predetermined flow rate at a first predetermined filling pressure;
   a fill line for cryogenic liquid having a first end open exteriorly of the outer tank and a second end open inside the inner tank, the fill line having a second predetermined flow rate at said first predetermined filling pressure, said second predetermined flow rate being several times said first predetermined flow rate; and
   a level sensor configured to determine a level of cryogenic liquid stored in the inner tank, the level sensor being a capacitance sensor having an inner rod disposed within a sleeve, the sleeve extending within the inner tank, the inner rod and the sleeve being formed of a conductive material, the supply line located within the sleeve of the level sensor.

2. The storage tank as set forth in claim 1, wherein a diameter of the fill line is twice as large as a diameter of the supply line.

3. The storage tank as set forth in claim 1, wherein said second end of the second end of the fill line is positioned adjacent a bottom of the inner tank.

4. The storage tank as set forth in claim 1, further including at least one baffle disposed in the inner tank.

5. The storage tank as set forth in claim 1, further including at least two baffles disposed in the inner tank.

6. The storage tank as set forth in claim 1, further including a relief vent configured to release gas generated by cryogenic liquid introduced into the inner tank via the fill line.

7. The storage tank as set forth in claim 6, wherein the relief vent has a diameter greater than the diameter of the fill line.

8. The storage tank as set forth in claim 1, further including a reporting unit, the reporting unit in communication with the level sensor and including a display for displaying the level determined by the level sensor.

9. The storage tank as set forth in claim 8, wherein the reporting unit includes a transmitter configured to transmit the level determined by the level sensor to a remote server.

10. The storage tank as set forth in claim 9, wherein the transmitter is configured to transmit a wireless signal.

\* \* \* \* \*